(12) United States Patent
Lopes et al.

(10) Patent No.: US 12,163,864 B2
(45) Date of Patent: Dec. 10, 2024

(54) LEAK DETECTION SYSTEM AND METHOD OF COMMUNICATION

(71) Applicant: WHIRLPOOL CORPORATION, Benton Harbor, MI (US)

(72) Inventors: Elisa Dias Rossi Lopes, Juiz de Fora (BR); Andre Luis Magalhaes Silva, Camanducaia (BR); Caroline Paiva Torres, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 292 days.

(21) Appl. No.: 17/720,765

(22) Filed: Apr. 14, 2022

(65) Prior Publication Data

US 2023/0332974 A1 Oct. 19, 2023

(51) Int. Cl.
*G01M 3/16* (2006.01)
*D06F 34/04* (2020.01)
*D06F 39/08* (2006.01)

(52) U.S. Cl.
CPC .............. *G01M 3/16* (2013.01); *D06F 34/04* (2020.02); *D06F 39/081* (2013.01)

(58) Field of Classification Search
CPC .......... G01M 3/16; G01M 3/20; G01M 3/202; G01M 3/04; G01M 3/205; G01M 3/38; G01M 3/26; G01M 3/243; G01M 3/24; G01M 3/2815; G01M 3/2807; G01M 3/002; G01M 3/165; G01M 3/18; G01M 3/40; G01M 3/226; G01M 3/02; G01M 3/22; G01M 3/00; G01M 3/229; G01M 3/045; G01M 3/025; G01M 3/007; G01M 3/32; G01M 3/3272; G01M 3/3245; G01M 3/047; G01M 3/005; G01M 3/228; G01M 3/28; G01M 3/3218; G01M 3/3263; G01M 3/2876; G01M 3/207; G01M 3/2892; G01M 3/3281; G01M 3/186; G01M 3/283; G01M 3/042; G01M 3/246; G01M 3/3236; G01M 3/2823; G01M 3/183; G01M 3/223;
(Continued)

(56) References Cited

U.S. PATENT DOCUMENTS 8,130,107 B2 * 3/2012 Meyer ..................... G01M 3/28
73/40
9,298,191 B2 * 3/2016 Meyer ..................... G01M 3/28
(Continued)

FOREIGN PATENT DOCUMENTS

WO 2002080597 A1 10/2002

OTHER PUBLICATIONS

European Search Report for Counterpart EP23167873.1, Dated Sep. 4, 2023, 7 Pages.

*Primary Examiner* — Andre J Allen
(74) *Attorney, Agent, or Firm* — McGarry Bair PC

(57) ABSTRACT

An appliance having a user interface with a first controller module, and at least one leak detector. The at least one leak detector having a housing with a second controller module communicatively coupled to the first controller module, and a power source communicatively coupled to the second controller module. The at least one leak detector further having at least one sensor communicatively coupled to the second controller module. The second controller module being configured to receive a status from at least one of either the power source or the at least one sensor.

20 Claims, 4 Drawing Sheets

(58) Field of Classification Search
CPC .. G01M 3/2853; G01M 3/3227; G01M 3/227; G01M 3/2846; G01M 3/3209; G01M 3/3254; G01M 3/36; G01M 3/329; G01M 3/022; G01M 3/182; G01M 3/222; G01M 3/34; G01M 3/06; G01M 3/12; G01M 3/184; G01M 3/188; G01M 3/363; G01M 3/10; G01M 3/225; G01M 3/187; G01M 3/366; G01M 3/08; G01M 15/14; G01M 3/2869; G01M 15/02; G01M 15/102; G01M 3/2861; G01M 3/224; G01M 1/225; G01M 3/181; G01M 3/027; G01M 3/2838; G01M 3/143; G01M 17/007; G01M 13/005; G01M 3/30; G01M 3/221; G01M 15/042; G01M 3/2884; G01M 5/0025; G01M 9/067; G01M 3/085; G01M 3/14; G01M 3/144; G01M 3/146; G01M 15/00; G01M 3/086; G01M 3/103; G01M 3/141; G01M 3/142; G01M 13/003; G01M 15/046; G01M 15/08; G01M 3/106; G01M 3/185; G01M 13/00; G01M 3/083; G01M 13/022; G01M 3/148; G01M 11/00; G01M 11/04; G01M 11/35; G01M 17/0074; G01M 17/02; G01M 17/021; G01M 17/022; G01M 15/09; G01M 15/104; G01M 17/024; G01M 17/04; G01M 5/0033; G01M 5/0091; G01M 9/02; G01M 9/04; G01M 99/005; G01M 11/0228; G01M 11/085; G01M 11/088; G01M 13/025; G01M 13/027; G01M 13/028; G01M 15/048; G01M 15/12; G01M 17/00; G01M 17/06; G01M 17/08; G01M 3/088; G01M 3/145; G01M 3/147; G01M 5/0066; G01M 7/00; G01M 7/02; G01M 7/027; G01M 7/08; G01M 9/00; G01M 99/00
See application file for complete search history.

(56) References Cited

U.S. PATENT DOCUMENTS

| | | | | |
|---|---|---|---|---|
| 10,837,160 | B2* | 11/2020 | Hammond | G01F 1/66 |
| 11,859,328 | B2* | 1/2024 | Woodham, Jr. | G08B 21/20 |
| 2014/0125525 | A1 | 5/2014 | Kane et al. | |
| 2015/0276544 | A1* | 10/2015 | Osoinach | G01M 3/16 |
| | | | | 324/664 |
| 2016/0376773 | A1 | 12/2016 | Abuhamdeh et al. | |
| 2017/0030528 | A1 | 2/2017 | Dietzen et al. | |
| 2018/0143057 | A1 | 5/2018 | Ravid et al. | |
| 2018/0212791 | A1 | 7/2018 | Garg et al. | |
| 2018/0317044 | A1 | 11/2018 | Chen et al. | |
| 2021/0012638 | A1 | 1/2021 | Jalilian et al. | |
| 2023/0393016 | A1* | 12/2023 | Hahn | H04R 1/08 |
| 2024/0035918 | A1* | 2/2024 | Fung-A-Wing | G01M 3/40 |

* cited by examiner

LEAK DETECTION SYSTEM AND METHOD OF COMMUNICATION

BACKGROUND

An appliance can utilize a fluid during operation of the appliance. For example, the appliance can be a laundry machine or a dishwasher, which uses water to clean the articles of clothing or dishes, respectively, within the appliance. During operation, however, the fluid can leak from the appliance in an undesirable fashion. This can be due to fault or otherwise not fluid-tight seals between various components of the appliance or with an external component (e.g., a valve for a fluid inlet/outlet that is coupled to the appliance through a valve). Letting the fluid leak without mitigation or correction can ultimately cause damage to the appliance or the surrounding environment or otherwise be a nuisance to a user of the appliance.

Traditionally, conventional leak detection systems have been used to detect leaks. These conventional detections systems include at least one leak detector having a sensor configured to detect the presence of a fluid. The at least one leak detector can be placed by a user anywhere around the appliance where ever the fluid may be in the event of a leak (e.g., the floor). The at least one leak detector must include a mother module or a central module that the at least one leak detector can communicate with. The central module can receive input from the at least one leak detector and communicate, in some way, to the user if a leak is detected. For example, the central module can include an audible alarm or a visually indicator that audibly or visually, respectively, indicates to the user if a leak has occurred. As another example, the central module can communicate with a user device in order to indicate to the user if a leak has occurred.

The conventional leak detection system, however, has a multitude of issues. For example, the at least one leak detector must run off of its own power supply (e.g., batteries). In the conventional leak detection system, a user is not able to tell how much available power storage is available on the power supply. As such, the at least one leak detector may cease to function when the power storage runs out without the user ever knowing. This, in turn, results in leaks possibly occurring without the user knowing.

As another example, the conventional leak detection system is retrofittable to the appliance. The user must buy the conventional leak detection system after purchasing the appliance and then find places to the put the at least one leak detector and the central module. Further, the conventional leak detection systems can be very costly. Specifically, the central unit can be very costly, while the at least one leak detector can be relatively cheap when compared to the central module. This is due to the fact that the central module includes costly extra components when compared to the at least one leak detector (:e.g., components that can communicate with a plurality of leak detectors, determine if a leak has occurred, and also indicate to the user that a leak has occurred).

As another example, the conventional leak detection system is not able to tell where a leak occurred, but only that a leak did occur. If the conventional leak detection system includes two or more leak detectors placed in different positions, the central unit is not able to determine which of the two or more leak detectors an input indicative of a leak came from, only that a leak has occurred. When this happens, the user must guess where the leak is by checking all locations where the two or more leak detectors are positioned. This requires the user to remember where the two or more leak detectors are and can be very time consuming.

BRIEF SUMMARY

In one aspect, the present disclosure relates to household appliance comprising a user interface having a first controller module, and at least one leak detector comprising a housing having a second controller module communicatively coupled to the first controller module, and a power source communicatively coupled to the second controller module, and at least one sensor communicatively coupled to the second controller module, wherein the second controller module is configured to receive a status from at least one of either the power source indicated of a storage capacity of the power source, or the at least one sensor indicative of a presence or non-presence of a fluid on the at least one sensor, and wherein the second controller module is configured to send, via a first wireless signal, the status to the first controller module.

In another aspect, the present disclosure relates to a leak detector retrofittable to a household appliance having a user interface with a first controller module, the leak detector comprising a housing having a power source and a second controller module communicatively coupled to the first controller module, a belt extending between a first end operatively coupled to the housing and a second end, at least one sensor communicatively coupled to the second controller module and provided along the belt, and a power source operatively coupled to the at least one sensor and communicatively coupled to the second controller module.

In another aspect, the present disclosure relates to a method of detecting a leak, via a leak detector, along a portion of an appliance having a user interface with a first controller module, the leak detector configured to follow the method comprising detecting, via at least one sensor communicatively coupled to the leak detector, a presence of a fluid on the at least one sensor, receiving, at a second controller module, a status of the at least one sensor indicative of a presence or a non-presence of a fluid on the at least one sensors, and transmitting, via the first controller module, a first wireless signal to the first controller module, the first wireless signal including the status.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
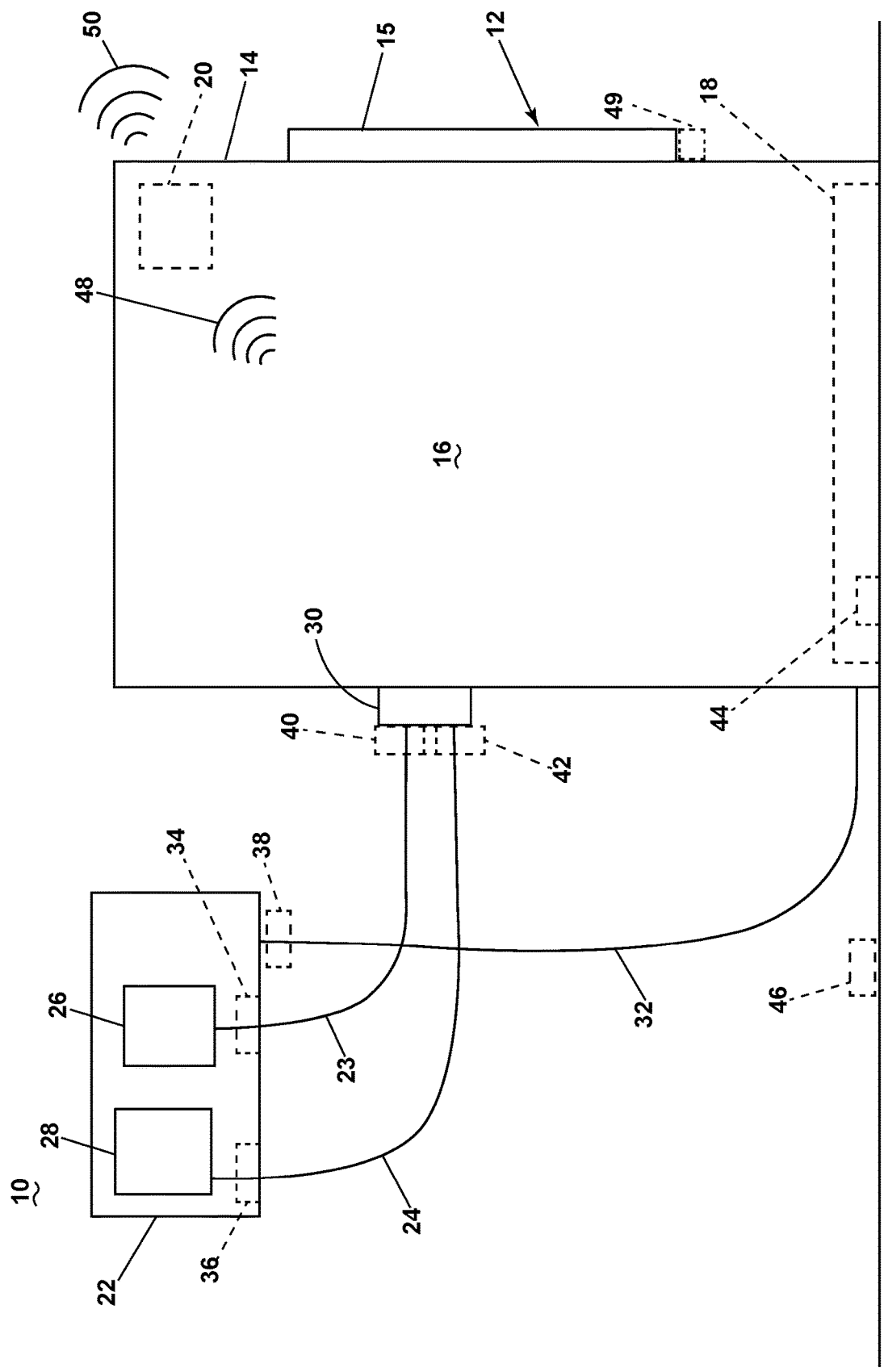
FIG. 1 is a schematic illustration of an environment including an appliance and a leak detection system with at least one leak detector.

Aspects of the disclosure relate to a leak detection system for an appliance and a method of communication using the leak detection system. The appliance can be any suitable commercial or household appliance. As a non-limiting example, the appliance can be a laundry treating appliance, a dishwasher, an oven, a refrigerator, a microwave, or the like. The appliance includes a first controller module configured to receive and transmit communications. The leak detection system can include at least one leak detector configured to detect the presence of a liquid on at least one sensor operably and communicatively coupled to the at least one leak detector. The at least one leak detector can further include a power source with a power storage. The at least one leak detector can include a second controller module configured to receive a status from at least one of the power storage or the at least one sensor. The second controller module can communicate the status to the first controller module. As used herein, the term "leak" can refer to any unintended or unwanted egress of fluid (e.g., water) from a component (e.g., hose, appliance, pipe, etc.) within an environment.

The leak detection system utilizes existing components within of the appliance. As a non-limiting example, the leak detection system can utilize the first controller module of the appliance in order to convey the status of the at least one leak detector to the appliance. It will be further appreciated that the first controller module can communicate with an external device (e.g., a smartphone or computer) operated by a user to convey the status to the user. The leak detection system can include a plurality of leak detectors that each independently communicate with the first controller module through respective second controller modules. The first controller module can determine which status comes from which leak detector of the plurality of leak detectors.

While "a set of" various elements will be described, it will be understood that "a set" can include any number of the respective elements. It will be yet further understood that the "a set" can include only one element. Also, as used herein, while elements or components can be described as "sensing" or "measuring" a respective value, data, function, or the like, sensing or measuring can include determining a value indicative of or related to the respective value, data, function, or the like, rather than directly sensing or measuring the value, data, function, or the like, itself. The sensed or measured value, data, function, or the like, can further be provided to additional components. For instance, the value can be provided to a controller module or processor, and the controller module or processor can perform processing on the value to determine a representative value or an electrical characteristic representative of said value, data, function, or the like.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc-Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Reference will now be made in detail to aspects of the disclosure, one or more non-limiting examples of which are illustrated in the FIGS. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

FIG. 1 is a schematic illustration of an environment 10 including an appliance 12 and a leak detection system with at least one leak detector. The environment 10 can include any number of one or more leak detectors. As a non-limiting example, the environment 10 can include a first leak detector 34, a second leak detector 36, a third leak detector 38, a fourth leak detector 40, a fifth leak detector 42, a sixth leak detector 44, a seventh leak detector 46, and an eighth leak detector 47. The appliance 12 can include a first controller module 20 that can communicate, via a first wireless signal 48, with the at least one leak detector. The appliance 12, as illustrated, is a dishwasher or a laundry treating appliance. It will be appreciated, however, that the appliance 12 can be any suitable appliance 12 including the first controller module 20. The at least one leak detector can be positioned within the environment 10 in an area that can include a liquid if a leak of fluid (e.g., water) occurs. The at least one leak detector can detect the presence of or non-presence of a fluid near the at least one detector and communicate a status indicative of at least the presence or non-presence of the fluid to the first controller module through the first wireless signal 48.

The appliance 12 can include a housing 14 defining an interior 16. A door 15 of the appliance 12 can provide selective access to at least a portion of the interior 16. The door 15 can be sealingly coupled to the housing 14 to impede or stop an egress of fluid from the interior 16 and through the door 15 or between the door 15 and the housing 14. Various components of the appliance 12 can be provided within the interior 16. As a non-limiting example, at least a portion of the first controller module 20 can be provided within the interior 16. A tray 18 can be provided near a bottom of the appliance 12 within the interior 16. It is contemplated that the tray 18 can be a physical tray configured to collect any potential fluid leaking from the appliance 12, or otherwise can be a bottom of the appliance 12. As a non-limiting example, the tray 18 can be a slidable drawer or tray provided at the bottom of the appliance 12. A user of the appliance 12 can remove or otherwise slide out the tray 18 from the appliance 12 in order to provide access to the tray 18 or internal components within the interior 16 of the appliance 12. It will be appreciated that the appliance 12 is schematically illustrated and can include any suitable components along the housing or within the interior 16.

A fluid source 22 can be included within the environment 10. As a non-limiting example, the fluid source 22 can be a water source that includes a hot water inlet 28 and a cold water inlet 26. The hot water inlet 28 and the cold water inlet 26 can each include respective valves, or a single valve, that can selectively fluidly couple a hot water or a cold water, respectively, to the environment 10. As a non-limiting example, the hot water inlet 28 can selectively fluidly couple the hot water, through a first hose 23, to the appliance 12. As a non-limiting example, the cold water inlet 26 can selectively fluidly couple the cold water to the appliance 12. The appliance 12 can further include a valve 30 that selectively fluidly couples at least one of the hot water or the cold water to the appliance 12. A third hose 32 can selectively fluidly couple a portion of the appliance 12 to the fluid source 22. The third hose 32 can act as a drain hose and drain any excess fluid from the appliance 12 and to a drain (not illustrated) of the fluid source 22 or another drain (not illustrated) within the environment 10.

The at least one leak detector is illustrated in phantom lines, meaning that the at least one leak detector can take any suitable shape or form. Further, the environment 10 does not need to include the at least one leak detector as illustrated. As a non-liming example, the at least one leak detector can be provided within any suitable portion of the environment 10 that can include the presence of a fluid if a leak occurs from a portion of the environment 10 (e.g., the fluid source 22, the first hose 23, the second hose 24, the third hose 32, the valve 30, or the appliance 12). As a non-limiting example, the first leak detector 34 can be provided within or near the fluid source 22 near the cold water inlet 26 (e.g., around or otherwise coupled to a portion of the first hose 23 near the cold water inlet 26). As a non-limiting example, the second leak detector 36 can be provided within or near the fluid source 22 near the hot water inlet 28 (e.g., around or otherwise coupled to a portion of the second hose 24 near the hot water inlet 28). As a non-limiting example, the third leak detector 38 can be provided near the drain of the fluid source 22 or the environment 10 (e.g., around or otherwise coupled to the third hose 32). As a non-limiting example, the fourth leak detector 40 and the fifth leak detector 42 can be provided near the valve 30 of the appliance 12 (e.g., near or otherwise coupled to a portion of the first hose 23 or the second hose 24, respectively). As a non-limiting example, the sixth leak detector 44 can be provided within the interior 16 of the appliance 12 (e.g., within the tray 18). As a non-limiting example, the seventh leak detector 46 can be provided within any other suitable location within the environment 10 (e.g., on the ground near the appliance 12 and under the fluid source 22). The eighth leak detector 49 can be provided along any suitable portion of the housing 14. As a non-limiting example, the eighth leak detector 49 can be provided near or along the door 15 and be configured to detect a leak of fluid from the door 15 or between the door 15 and the housing 14.

While illustrated as being provided in or around the appliance 12, it will be appreciated that the at least one leak detector can be provided remotely from the appliance 12 or near another appliance within the environment 10. As a non-limiting example, the appliance 12 can be an appliance that does not utilize a fluid to function, however, the appliance includes the first controller module 20. The environment 10, can further include a second appliance that does utilize a fluid to operate, but the appliance does not include the first controller module 20. The at last one leak detector can be provided near the second appliance and be configured to detect the presence of or non-presence of the fluid, with the presence of the fluid being indicative of a leak from the second appliance. Alternatively, the at least one leak detector can be provided within a portion of the environment 10 that is not near an appliance, but can include a fluid from a leak (e.g., under a sink). Alternatively, the first appliance 12 can be an appliance that utilizes the fluid to function and the at least one leak detector can be positioned near the appliance to detect a possible leak from the appliance 12.

During operation, the each of the first leak detector 34, the second leak detector 36, the third leak detector 38, the fourth leak detector 40, the fifth leak detector 42, the sixth leak detector 44, the seventh leak detector 46 and the eighth leak detector 47 can be configured to detect the presence of a fluid at or near the location where the respective leak detector is provided within the environment 10. Each leak detector is configured to independently create a status that can be received by the first controller module 20 via the first wireless signal 48. The status can be indicative of an operational state of the at least one leak detector. As used herein, the operational state can be a power storage, a positioning of, or a sensor reading of the at least one leak detector. The first controller module 20 can then generate a message containing the status that can be transmitted to an external device via the second wireless signal 50. The external device can be any suitable external device such as, but not limited to, a smartphone, a computer, a television, an intercom, or the like. As such, a user of the external device can receive the message from the first controller module 20 and view the status of the at least one leak detector. Alternatively, the second wireless signal 50 can be an audible signal (e.g., an alarm) or a visual signal (e.g., a flashing light) indicative of the status. As a non-limiting example, the status can be that a fluid has been detected at the at least one fluid detector, meaning that a leak has occurred. The first controller module 20 can generate the message and convey to a user of the appliance 12 that a leak has occurred.

The first wireless signal 48 and the second wireless signal 50 can be any suitable wireless signal. As a non-limiting example, the first wireless signal 48 and the second wireless signal 50 can be a wireless signal communicated over Bluetooth, Near Field Communication (NFC), WiFi, Data, or the like. As a non-liming example, the at least one leak detector can be communicatively coupled to the first controller module 20 through Bluetooth communication such that the first wireless signal 48 is a Bluetooth signal. In the case of the Bluetooth signal, it will be appreciated that the environment 10 does not need to have an existing communication network (e.g., a WiFi network) in order for the status of the at least one leak detector to be conveyed to the first controller module 20. As a non-limiting example, the first controller module 20 can be communicatively coupled to the external device via a WiFi network such that the second wireless signal 50 is a WiFi signal.

It is contemplated that the first controller module 20 can determine a location of the at least one leak detector through the first wireless signal 48. As a non-limiting example, the first controller module 20 can be configured to measure a direction or strength of the first wireless signal 48. The direction and strength can be used to determine a location of the at least one leak detector. The location of the at least one leak detector can be communicated through the external device through the second wireless signal 50. As such, a user of the external device can determine which status is coming from which leak detector in the environment 10.

Figure 2:
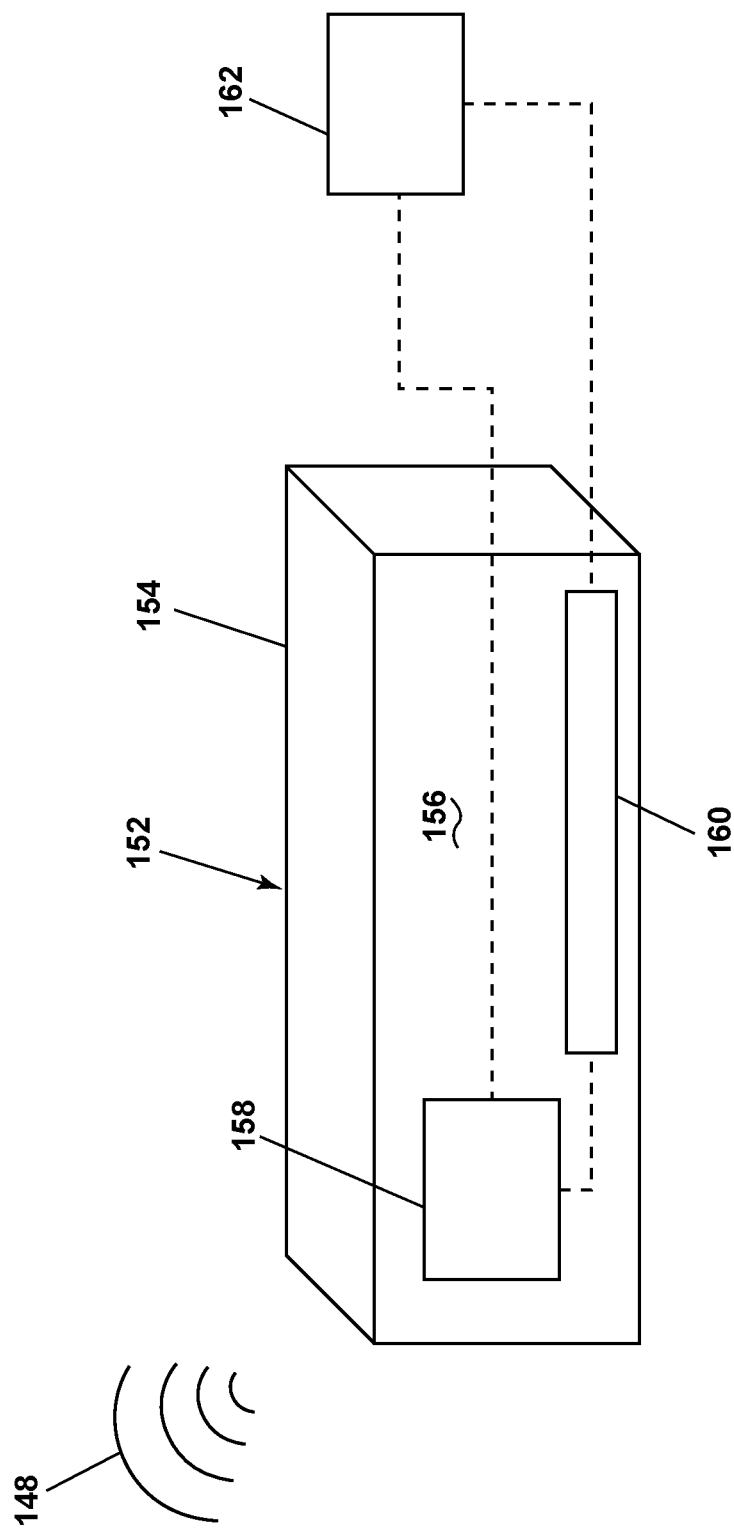
FIG. 2 is a schematic perspective view of an exemplary leak detector suitable for use as the at least one leak detector of FIG. 1.

FIG. 2 is a schematic perspective view of an exemplary leak detector 152 suitable for use as the at least one leak detector of FIG. 1. The leak detector 152 is similar to at least one leak detector of FIG. 1, therefore, like parts will be identified with like numerals increased to the 100 series, with it being understood that the description of the like parts of the at least one leak detector of FIG. 1 applies to the leak detector 152 unless otherwise noted.

The leak detector 152 can include a housing 154 with an interior 156. A second controller module 158 can be provided within the interior 156. A power storage 160 can be provided within the interior 156. As a non-limiting example, the power storage 160 can be a battery (e.g., a pack of batteries, a single batter, a rechargeable battery, etc.). At least one sensor 162 can be provided exterior to the housing 154. The at least one sensor 162 can be any suitable sensor configured to detect the presence of a fluid such as water. As a non-limiting example, at least one sensor 162 can be a capacitive sensor. As a non-limiting example, the at least one sensor can be, but is not limited to, a microelectromechanical system (e.g., a microphone), a hygrometer, or a measurement of a signal strength of an integrated circuit of the at least one leak detector. As a non-limiting example, the at least one sensor can be an integrated circuit and the second controller module 158 continuously or intermittently monitor a signal or a strength of the signal of the integrated circuit. In in instance where a fluid (e.g., water) comes into contact with the integrated circuit, the signal strength can degrade. The second controller module 158 can read this degradation of the signal strength as a detection of water or outer fluid.

The power storage 160 can be directly or indirectly operatively coupled to the second controller module 158 and the at least one sensor 162 in order to provide power to the second controller module 158 and the at least one sensor 162. The second controller module 158 can be directly or indirectly communicatively coupled to the power storage 160 and the at least one sensor 162 such that the second controller module 158 can receive or otherwise obtain a status from the at least one sensor 162 and the power storage 160. As a non-limiting example, the power storage 160 can have an available power capacity or storage and the second controller module 158 can be communicatively coupled to the power storage such that the second controller module 158 can monitor or otherwise obtain a status from the power storage 160 indicative of the available power capacity or storage of the power storage 160. As a non-limiting example, the at least one sensor 162 can be communicatively coupled to the second controller module 158 and be configured to send a status or an input to the second controller module 158 indicative of the presence of or the non-presence of a liquid on the at least one sensor 162. The second controller module 158 can receive or otherwise obtain a continuous or periodic status from at least one of the power storage 160 or the at least one sensor 162.

During operation, the second controller module 158 can generate a first wireless signal 148 containing the status of at least one of the power storage 160 or the at least one sensor 162. The first wireless signal 148 can be a periodic or continuous signal that is received by the first controller module 20 (FIG. 1) of the appliance 12. At least one of the first controller module 20 or the second controller module 158 can include a processor configured to receive the status and determine what the status is indicating (e.g., a power storage, a leak detector, etc.). The status, as discussed herein, can then be communicated to an external device through the second wireless signal 50 (FIG. 1). As a non-limiting example, the status can be a power storage of the leak detector 152 and the user of the external device can utilize the external device to check on the power storage or available power storage of the leak detector.

It is yet further contemplated that the second controller module 158 can be circumvented or otherwise not included. This can be done by establishing a connection directly between the first controller module 20 and the various components of the leak detector 150. As a non-limiting example, the various components (e.g., the power storage 160 and the at least one sensor 162) can establish communication with the first controller module 20 directly (e.g., through the first wireless signal 148). In such a way, the first controller module can monitor the status of the leak detector 150 without having to establish connection with the second controller module 158. In such a case, the first controller module 20 can establish a connection with various portions of the components of the leak detector 150. As a non-limiting example, the power storage 160 can be a battery including a battery management system or controller. The first controller module 20 can establish a connection directly with the battery management system. As a non-limiting example, the at least one sensor 162 can be an integrated circuit that transmits a continuous or intermittent signal. The first controller module 20 can intercept to signal and determine a strength of the signal. When the integrated circuit detects water, the signal strength can degrade, thus indicating the presence of water to the first controller module 20.

Figure 3:
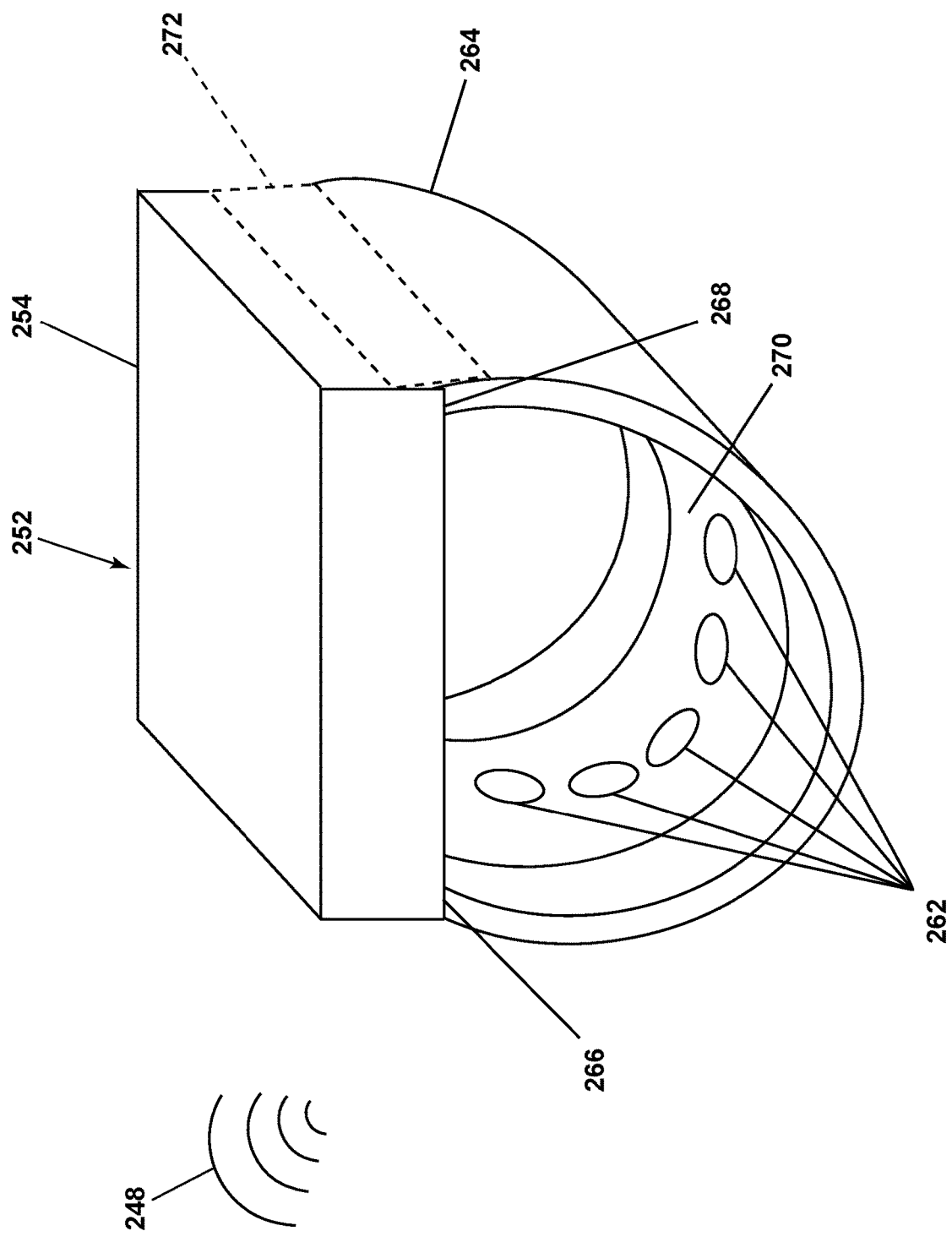
FIG. 3 is a schematic perspective view of an exemplary leak detector suitable for use as the at least one leak detector of FIG. 1.

FIG. 3 is a schematic perspective view of an exemplary leak detector 252 suitable for use as the at least one leak detector of FIG. 1. The leak detector 252 is similar to at least one leak detector of FIG. 1 and the leak detector 152, therefore, like parts will be identified with like numerals increased to the 200 series, with it being understood that the description of the like parts of the at least one leak detector of FIG. 1 and the leak detector 152 applies to the leak detector 252 unless otherwise noted.

The leak detector 252 can include a housing 154 defining an interior (not illustrated). A second controller module (not illustrated) and a power storage (not illustrated) can be provided within the interior. At least one sensor 262 can be communicatively coupled to the second controller module and operatively coupled to the power storage. The leak detector 252 is configured to generate the first wireless signal 248 including the status of at least one of the power storage or the at least one sensor 262.

The leak detector 252 is similar to the leak detector 152, except that the leak detector 252 includes a belt 264 or a band extending between a first end 266 and a second end 268. The first end can be operatively coupled or otherwise formed integrally with the housing 254. The second end 268 can be selectively coupled to the housing 254.

The housing 254 can include a lock 272 or a catch that secures the second end 268 of the belt 264 to the housing 254. The lock 272 is shown in phantom lines, meaning that the lock can take any suitable shape or form. As a non-limiting example, the lock 272 can be a loop that the belt 264 is fed through in order to retain the belt 264 in a fixed position. It is contemplated that the lock can releasably retain the second end 268 of the belt 264 to the housing 254 such that the second end 268 can be selectively removed from the housing 254 and the leak detector 252 moved from around the portion of the environment 10 it is provided within.

The leak detector 252 further includes a sensor strip 270 integrally formed or otherwise provided along the belt 264. The sensor strip 270 can included the at least one sensor 262. As a non-limiting example, the at least one sensor 262 can be provided within a plurality of sensors. Each sensor 262 is configured to detect the presence or the non-presence of a fluid on the respective sensor 262. The belt 264 can be any suitable belt 264 or strip of material including the at least one sensor 262. The lock 272 can be any suitable lock configured to secure the second end 268 of the belt 264 to the housing 254. As a non-limiting example, the lock 272 can be a adhesive patch or a magnet that is configured to grab onto, or otherwise retain the second end 268 of the belt 264. In the case of the lock 272 being a magnet, the second end 268 can include an oppositely charged magnet such that when the two magnets come into contact, the second end 268 snaps to and is retained against the housing 254. It will be further appreciated that the lock 272 does not need to be included. As a non-limiting example, the first end 266 and the second end 268 can each be operatively coupled to or formed integrally with the housing 254 such that the belt 264 and the housing 254 form a ring. It will be further appreciated that the belt 264 can be formed of an elastic material such that the belt 264 can be stretched and be biased back towards its original, non-stretched configuration.

When installing the leak detector 252, the second end 268 can be removed from the housing 254 and wrapped around a portion of the environment 10 (e.g., a hose) such that the sensor strip 270 and the at least one sensor 262 contacts a portion of the environment 10 where fluid may be present in the instance of a leak. The second end 268 can then be secured to the housing 254 such that the leak detector 252 is secured around and retained to a portion of the environment 10. Alternatively, the belt 264 does not need to be within the lock 272 in order for the leak detector 252 to function. As a non-limiting example, the leak detector 252 can be placed on the ground or in the tray 18 (FIG. 1) in a configuration where the second end 268 is not secured to the housing 254. As such, the belt 264 can extend form the housing 254 in a non-loop or circular fashion, as illustrated (e.g., the belt 264 can form a strip extending from the housing 254). In an instance where the lock 272 is not included and the belt 264 is an elastic material, the belt 264 can be stretched such that it fits over and around a portion of the environment 10. The belt 264 can then be biased back to its original, un-stretched configuration. This biasing can result in a constrictive force being applied to a portion of the environment 10 that the leak detector 252 envelopes. This, in turn, can retain the leak detector 252 in its desired location in the environments 10.

Figure 4:
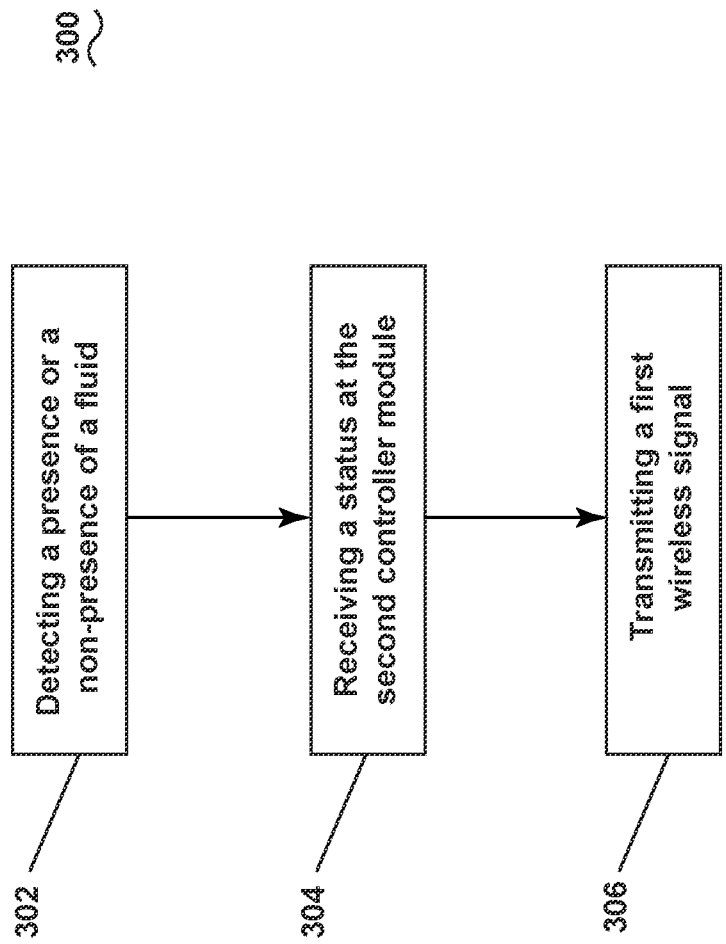
FIG. 4 is a method of detecting a presence or a non-presence of a fluid using the leak detection system of FIG. 1.

FIG. 4 is a method 300 of detecting a presence or a non-presence of a fluid using the leak detection system of FIG. 1. While described in terms of the leak detection system including the at least one leak detector of FIG. 1, it will be appreciated that the method 300 can be used with the leak detector 152 of FIG. 2 or the leak detector 252 of FIG. 3. Further, while described in terms of a single leak detector, it will be appreciated that the method 300 can include any number of one or more leak detectors.

The leak detection system can be configured such that a presence or a non-presence of a fluid can be detected, via at least one sensor (e.g., the at least one sensor 162, 262) communicatively coupled to the leak detector, at 302. In other words, a measurement can be taken, via the at least one sensor, that is indicative of there either being a fluid on the at least one sensor or no fluid being present on the at least one sensor, at 302. The second controller module (e.g., the second controller module 158, 258) of the leak detector, can receive a status indicative of the presence or the non-presence of the fluid on the at least one sensor, at 304. The second controller module can then transmit the first wireless signal 48 to the first controller module 20, at 306. The first wireless signal 48 can include the status.

The sequences depicted are for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, the method 300 can include various other steps.

As a non-limiting example, it will be appreciated that the first wireless signal 48 can be transmitted over any suitable wireless network as described herein. As a non-limiting example, the first wireless signal 48 can be over Bluetooth communication. As such, the method 300 can including pairing the leak detector with the first controller module 20 such that the leak detector can communicate with the first controller module 20 over the Bluetooth network.

As a non-limiting example, the method 300 can include continuously receiving the status of the at least one sensor at the second controller module. In other words, the second controller module can continuously monitor or otherwise receive a continuous stream of data from the at least one sensor. Further, the method 300 can include continuously transmitting the first wireless signal 48 having the status from the second controller module and to the first controller module 20.

As a non-limiting example, the method 300 can include receiving, at the second controller module, a status of the power storage (e.g., the power storage 160) of the leak detector in a continuous or non-continuous fashion. As such, the status that is communicated to the first controller module 20 can also include a power storage availability or capacity of the power storage.

As a non-limiting example, the method 300 can include notifying, through the first controller module 20, a user of the appliance 12 to the status of the leak detector. The notification can be through an audible notification (e.g., an alarm), a visual notification (e.g., a flashing light) or a wireless notification through the second wireless signal 50. The method 300 can further include transmitting, via the first controller module 20, a second wireless signal 50 to an external device (e.g., a smartphone, a tablet, a computer, etc.) of a user of the external device. As discussed herein, the second wireless signal 50 can include the status of the leak detector, which can include a location of the leak detector, the power storage capacity of the leak detector, and/or the presence or non-presence of fluid along the at least one sensor of the leak detector.

Benefits of the present disclosure include a leak detection system with a smaller cost burden when compared to a conventional leak detection system. For example, the conventional leak detection system is formed separate from the appliance. In other words, the conventional leak detection system does not utilize a portion of the appliance to function. For example, the conventional leak detection system utilizes at least one leak detector that is communicatively coupled to a central module. The central module includes components to receive communications from the at least one leak detector and notify a user of the appliance to the presence of a leak. The leak detection system as described herein, however, utilizes existing components on the appliance. For example, instead of a central module, as required by the conventional leak detection system, the leak detection system as described herein utilizes the first controller module of the appliance, which can then notify the user of the status of the leak detector(s). The elimination of the central module is a clear advantage over the conventional leak detection system as the user of the appliance no longer needs to purchase a central module. Instead, the user only needs to purchase the leak detector(s). Further, the elimination of the central module reduces the footprint of the leak detection system as a user no longer needs to find a location to put the central unit, and instead only needs to place the leak detectors in the desired locations. Further yet, the central module of the conventional leak detection system requires a power input of some kind. This can either be via a household plug or batteries. The elimination of the central unit means that a user does not need to find an available plug or purchase additional batteries for the central unit.

Another benefit of the present disclosure is a leak detection system with increased versatility when compared to the conventional leak detection system. For example, conventional leak detections systems transmit a status (e.g., an audible beep or another notification) indicative of the presence of a leak or water. The leak detection system as described herein, however, can transmit the status of one or more leak detectors with the status including a presence or non-presence of water (e.g., the presence or non-presence of a leak), the status of the power storage (e.g., the available power storage), and the location of the leak detector. This ensures that the use of the appliance can have a full and clear understanding of the leakage detection system and be able to determine the status of each and every leak detector within the leak detection system. This ultimately results in a leak detection system with a greater versatility when compared to the conventional leak detection system.

To the extent not already described, the different features and structures of the various aspects can be used in combination with each other as desired, or can be used separately. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure. Hence, specific dimensions and other physical characteristics relating to the aspects disclosed herein are not to be considered as limiting, unless expressly stated otherwise.

Further aspects of the invention are provided by the subject matter of the following clauses:

An appliance provided within an environment, the appliance comprising a first controller module, and at least one leak detector provided within the environment, the at least one leak detector comprising a housing having a second controller module communicatively coupled to the first controller module, and a power source communicatively coupled to the second controller module, and at least one sensor communicatively coupled to the second controller module, wherein the second controller module is configured to receive a status from at least one of either the power source indicated of a storage capacity of the power source, or the at least one sensor indicative of a presence or non-presence of a fluid on the at least one sensor and wherein the second controller module is configured to send, via a first wireless signal, the status to the first controller module.

The appliance of any preceding clause, wherein the status is continuously sent to the first controller module, through the second controller module.

The appliance of any preceding clause, wherein the at least one leak detector comprises a belt extending from the housing and having the at least one sensor provided along a portion of the belt.

The appliance of any preceding clause, further comprising a plurality of leak detectors including the at least one leak detector, each leak detector of the plurality of leak detectors.

The appliance of any preceding clause, wherein the first controller module is configured to determine a location of each leak detector of the plurality of leak detectors based on a signal strength of each status received from each respective leak detector.

The appliance of any preceding clause, wherein the second controller module is configured to send the status to the first controller module in a periodic or continuous stream.

The appliance of any preceding clause, wherein the power source is a battery.

The appliance of any preceding clause, wherein the first controller module is configured to output the status to a user device, via a second wireless signal different from the first wireless signal.

The appliance of any preceding clause, wherein the first wireless signal is a Bluetooth signal.

The appliance of any preceding clause, wherein the appliance is a laundry appliance.

The appliance of any preceding clause, wherein the at least one sensor is a capacitive sensor.

The appliance of any preceding clause, wherein the at least one leak detector is a retrofittable leak detector that can be fit onto the appliance by a user of the appliance and the first controller module is an existing controller module that is operably coupled to the appliance during manufacture of the appliance.

The appliance of any preceding clause, wherein the at least one leak detector is provided along or within a portion of the appliance.

An appliance provided within an environment, the appliance comprising a first controller module, and at least one leak detector provided within the environment and configured to generate a first wireless signal with the first controller module, wherein the first controller module is configured to determine a location of the at least one leak detector based on a signal strength of the first wireless signal.

The appliance of any preceding clause, further comprising a plurality of leak detectors including the at least one leak detector, wherein each leak detector of the plurality of leak detectors is configured to generate a respective first wireless signal.

The appliance of any preceding clause, wherein the first controller module is configured to determine a location of each leak detector of the plurality of leak detectors based on a signal strength of each respective wireless signal.

The appliance of any preceding clause, wherein the at least leak detector comprises at least one sensor configured to detect the presence or non-presence of a fluid, and a power source, wherein the first wireless signal includes a status of at least one of a power storage capacity of the power source or the presence or non-presence of the fluid.

The appliance of any preceding clause, wherein the at least one leak detector further comprises a housing having a second controller module communicatively coupled to the power source and the at least one sensor, the second controller module configured to receive the status and transmit the status to the first controller module as the first wireless signal.

A method of detecting a leak, via a leak detector, along a portion of an appliance having a user interface with a first controller module, the leak detector configured to follow the method comprising detecting, via at least one sensor communicatively coupled to the leak detector, a presence of a fluid on the at least one sensor, receiving, at a second controller module, a status of the at least one sensor indicative of a presence or a non-presence of a fluid on the at least one sensor, and transmitting, via the first controller module, a first wireless signal to the first controller module, the first wireless signal including the status.

The method of any preceding clause, further comprising continuously receiving, at the second controller module, the status of the at least one sensor, and continuously transmitting, via the second controller module, the first wireless signal.

What is claimed is:

1. An appliance provided within an environment, the appliance comprising:
   a first controller module; and
   at least one leak detector, the at least one leak detector comprising:
      a housing having a second controller module communicatively coupled to the first controller module, and a power source communicatively coupled to the second controller module; and
      at least one sensor communicatively coupled to the second controller module;
   wherein the second controller module is configured to receive a status from at least one of either the power source indicated of a storage capacity of the power source, or the at least one sensor indicative of a presence or non-presence of a fluid on the at least one sensor;
   wherein the second controller module is configured to send, via a first wireless signal, the status to the first controller module; and
   wherein the at least one leak detector is a retrofittable leak detector that can be fit onto the appliance by a user of the appliance and the first controller module is an existing controller module that is operably coupled to the appliance during manufacture of the appliance.

2. The appliance of claim 1, wherein the status is continuously sent to the first controller module, through the second controller module.

3. The appliance of claim 1, wherein the at least one leak detector comprises a belt extending from the housing and having the at least one sensor provided along a portion of the belt.

4. The appliance of claim 1, wherein the at least one leak detector is a plurality of leak detectors, and each leak detector of the plurality of leak detectors is configured to generate a respective first wireless signal.

5. The appliance of claim 4, wherein the first controller module is configured to determine a location of each leak detector of the plurality of leak detectors based on a signal strength of each status received from each respective leak detector.

6. The appliance of claim 1, wherein the second controller module is configured to send the status to the first controller module in a periodic or continuous stream.

7. The appliance of claim 1, wherein the first controller module is configured to output the status to a user device, via a second wireless signal different from the first wireless signal.

8. The appliance of claim 1, wherein the first wireless signal is a Bluetooth signal.

9. The appliance of claim 1, wherein the appliance is a laundry appliance.

10. The appliance of claim 1, wherein the at least one sensor is a capacitive sensor.

11. The appliance of claim 1, wherein the at least one leak detector is provided along or within a portion of the appliance.

12. An appliance provided within an environment, the appliance comprising:
    a first controller module; and
    at least one leak detector provided within the environment and configured to generate a first wireless signal with the first controller module;
    wherein the first controller module is configured to determine a location of the at least one leak detector based on a signal strength of the first wireless signal.

13. The appliance of claim 12, wherein the at least one leak detector is a plurality of leak detectors, and each leak detector of the plurality of leak detectors is configured to generate a respective first wireless signal.

14. The appliance of claim 13, wherein the first controller module is configured to determine a location of each leak detector of the plurality of leak detectors based on a signal strength of each respective wireless signal.

15. The appliance of claim 12, wherein the at least leak detector comprises:
    at least one sensor configured to detect the presence or non-presence of a fluid; and
    a power source;
    wherein the first wireless signal includes a status of at least one of a power storage capacity of the power source or the presence or non-presence of the fluid.

16. The appliance of claim 15, wherein the at least one leak detector further comprises a housing having a second controller module communicatively coupled to the power source and the at least one sensor, the second controller module configured to receive the status and transmit the status to the first controller module as the first wireless signal.

17. An appliance provided within an environment, the appliance comprising:
    a first controller module; and
    at least one leak detector, the at least one leak detector comprising:
       a housing having a second controller module communicatively coupled to the first controller module, and a power source communicatively coupled to the second controller module; and
       at least one sensor communicatively coupled to the second controller module;
    wherein the second controller module is configured to receive a status from at least one of either the power source indicated of a storage capacity of the power source, or the at least one sensor indicative of a presence or non-presence of a fluid on the at least one sensor;
    wherein the second controller module is configured to send, via a first wireless signal, the status to the first controller module; and
    wherein the at least one leak detector comprises a belt extending from the housing and having the at least one sensor provided along a portion of the belt.

18. The appliance of claim 17, wherein the status is continuously sent to the first controller module, through the second controller module.

19. The appliance of claim 17, wherein the at least one leak detector is a plurality of leak detectors, and each leak detector of the plurality of leak detectors is configured to generate a respective first wireless signal.

20. The appliance of claim 17, wherein the first controller module is configured to determine a location of each leak detector of the plurality of leak detectors based on a signal strength of each status received from each respective leak detector.

* * * * *